(12) United States Patent
Mohaban et al.

(10) Patent No.: US 7,209,473 B1
(45) Date of Patent: Apr. 24, 2007

(54) METHOD AND APPARATUS FOR MONITORING AND PROCESSING VOICE OVER INTERNET PROTOCOL PACKETS

(75) Inventors: Shai Mohaban, Sunnyvale, CA (US); Itzhak Parnafes, Palo Alto, CA (US); Opher Kahane, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1535 days.

(21) Appl. No.: 09/724,943

(22) Filed: Nov. 28, 2000

Related U.S. Application Data

(60) Provisional application No. 60/226,207, filed on Aug. 18, 2000.

(51) Int. Cl.
*H04L 12/66* (2006.01)
*H04L 12/56* (2006.01)
*G06F 15/173* (2006.01)
*H04L 12/26* (2006.01)

(52) U.S. Cl. .................. 370/352; 370/392; 370/235; 709/239

(58) Field of Classification Search .................. None
See application file for complete search history.

(56) References Cited

U.S. PATENT DOCUMENTS

| | | | |
|---|---|---|---|
| 5,235,595 A | 8/1993 | O'Dowd | 370/94.1 |
| 6,151,318 A | 11/2000 | Woodward et al. | 370/392 |
| 6,263,371 B1 | 7/2001 | Geagan, III et al. | 709/231 |
| 6,266,341 B1 | 7/2001 | Surprenant et al. | 370/458 |
| 6,278,707 B1 | 8/2001 | MacMillan et al. | 370/352 |
| 6,292,480 B1 | 9/2001 | May | 370/352 |
| 6,292,482 B2 | 9/2001 | Pickett | 370/352 |
| 6,292,840 B1 | 9/2001 | Blomfield-Brown et al. | 709/247 |
| 6,389,038 B1 | 5/2002 | Goldberg et al. | 370/471 |
| 6,477,164 B1 | 11/2002 | Vargo et al. | 370/356 |
| 6,608,841 B1 | 8/2003 | Koodli | 370/474 |

(Continued)

OTHER PUBLICATIONS

U.S. Appl. No. 10/929,064, entitled "Multimedia Over Internet Protocol Border Controller for Network-Based Virtual Private Networks," filed Aug. 26, 2004, 38 pages.
International Search Report for International Application No. PCT/US2001/24805, mailed Nov. 28, 2001, 4 pgs.

*Primary Examiner*—Steven Nguyen
(74) *Attorney, Agent, or Firm*—Shumaker & Sieffert, P.A.

(57) ABSTRACT

A processor architecture for processing data packets representing voice over Internet Protocol (VoIP) calls in a packet-switched network is disclosed. According to an embodiment, a VoIP processor executes a voice packet processing operating system that is configured to monitor or manipulate the packets at an IP layer, media layer and signaling layer of the call. The VoIP processor includes a plurality of independently callable primitive software functions that carry out low-level VoIP packet processing functions. The VoIP processor executes one or more application programs that selectively call one or more of the primitive software functions and are independent of any underlying protocols of the existing network, thereby isolating the application programs from low-level processing details. Further, techniques are described for modifying characteristics of VoIP traffic for the purpose of monitoring and directing the VoIP traffic through a network. The techniques include extracting information associated with the VoIP traffic and using the information for the purpose of controlling access, for fraud detection, for billing, for enforcing policy decisions, for protection against denial of service attacks, for lawful interception, for service selection, and other applications.

61 Claims, 10 Drawing Sheets

U.S. PATENT DOCUMENTS

| | | |
|---|---|---|
| 6,618,397 B1 | 9/2003 | Huang .................. 370/474 |
| 6,654,373 B1 * | 11/2003 | Maher et al. ............ 370/392 |
| 6,700,888 B1 | 3/2004 | Jonsson et al. .......... 370/392 |
| 6,788,675 B1 | 9/2004 | Yang .................... 370/352 |
| 6,791,944 B1 | 9/2004 | Demetrescu et al. ...... 370/235 |

* cited by examiner

VOIP APPLICATIONS 404

> RTP AGGREGATION APPLICATION 414

> APPLICATION-LEVEL CALL ROUTING APPLICATION 431

> SCALABLE TRAFFIC ENGINEERING APPLICATION 433

> RSVP AGGREGATION APPLICATION 435

> LOAD BALANCING APPLICATION 437

> BILLING & INTERCONNECT VERIFICATION 439

> ACCESS CONTROL/FRAUD DETECTION 441

> RTP RECONSTRUCTION APPLICATION 443

> CALL PRIVACY APPLICATION 445

> DIFFERENTIATED SERVICES APPLICATION 447

> LAWFUL INTERCEPTION APPLICATION 449

> SERVICE SELECTION APPLICATION 451

*FIG. 4C*

METHOD AND APPARATUS FOR MONITORING AND PROCESSING VOICE OVER INTERNET PROTOCOL PACKETS

RELATED APPLICATION

This application claims domestic priority from prior U.S. Provisional application Ser. No. 60/226,207, filed Aug. 18, 2000, entitled "Method and Apparatus for VoIP Traffic Processing," and naming as inventors S. Mohaban et al., the entire disclosure of which is hereby incorporated by reference as if fully set forth herein.

FIELD OF THE INVENTION

The present invention relates generally to data networks that carry voice traffic. The invention relates more specifically to a method and apparatus for monitoring and processing information traveling over Internet Protocol IP networks including voice over IP, video over IP, and streaming media.

BACKGROUND OF THE INVENTION

Packet-switched data networks now carry a high volume of messages ("traffic") pertaining to specialized services such as digitized voice, music, video, and streaming media. There is particular technical interest in improving the capabilities of the global, packet-switched family of internetworks known as the Internet for carrying voice conversations, as an alternative to the traditional circuit-switched public telephone network. Advancements in voice over Internet Protocol services (VoIP) have lead to development of numerous technical recommendations and protocols. Significantly, VoIP is no longer a technical novelty, but a real business for a growing number of for-profit organizations that sell and service VoIP connectivity ("service providers"). An overview of these developments is provided in U. Black, "Voice Over IP" (Prentice-Hall, 2000).

VoIP service providers now face challenges similar to those experienced by electronic commerce ("eCommerce") service providers at the onset of the Internet explosion. The typical eCommerce service provider network comprised routers, switches, Web servers and application servers. Architectural limitations inherent in this configuration initially prevented eCommerce service providers from effectively increasing their services while maintaining the expected high quality of service with minimal operational costs. Certain limitations in the areas of network performance, quality of service (QoS), and security have been addressed by the development of specialized networking hardware and software, such as local and distributed load balancers, cache engines, QoS processors, firewalls, application level security processors, etc.

Similar operational challenges are now appearing as a result of significant growth of commercial VoIP traffic. In particular, Internet Protocol is not designed to accommodate synchronous, real-time traffic, such as voice. Also, traffic losses typically experienced in IP networks, as well as the amount and variability of delay in transmitting packets, hampers effective support of voice and video traffic in an IP network.

Another problem stems from the disparate nature of the public Internet. The Internet is an amalgamation of disparate networks and service providers and thus there is no guaranteed bandwidth for a voice call. These and other barriers may prevent successful deployment of VoIP, as described in Black.

In addition, limitations of IP network infrastructure impose costs on VoIP service providers and reduce profitability. Bandwidth costs, billing discrepancies, network congestion that causes quality degradation, complex network management and limited control of network access directly affect profitability for VoIP service providers. IP networks simply impose inherent architectural constraints on basic VoIP elements, creating barriers to effective resolution of technical problems that affect profitability.

One specific technical problem is that current VoIP network elements require extensive device-specific application programming in order to produce working software. Application programmers are required to write code to carry out the same primitive operations on an ongoing basis. There is a need for improved modularization of such primitive operations.

A related problem is that current VoIP network elements typically operate only at one particular layer among the Open Systems Interconnect (OSI) logical model of network messaging. One VoIP element may process packets at the transport layer, another at the media layer, and still another at the signaling layer. When a software application needs to carry out operations at multiple layers, it is required to distribute its operations across multiple devices. Such applications rapidly become extremely complex. There is a need to provide a way to process packets at multiple layers concurrently and in a way that hides processing details at each layer from the application programmer.

One approach to addressing some of these problems might be to configure a router or switch for implementing low-level packet processing functions. However, routers and switches are not designed for and do not offer any programmable interfaces to external applications; therefore, external applications could not use such low-level functions. Further, they are not always located in the network at a place that is convenient to carry out aggregation, or at a location from which they can process traffic from multiple VoIP gateways and many IP phones.

Based on the foregoing, there is clear need for an improved method for processing VoIP traffic without requiring any modifications to the existing IP and VoIP network infrastructure.

Further, there is a need for a way to efficiently monitor and modify packets involved in VoIP traffic at a plurality of logical layers in a single processing element.

There is also a need for a VoIP processor that exposes programmable packet processing interfaces to application programs, thereby allowing such programs to use and control primitive packet processing functions.

There is also a need for a VoIP processor that can be placed in the network at a location that facilitates aggregation of network data and processing traffic from multiple VoIP gateways and IP phones.

SUMMARY OF THE INVENTION

A processor architecture for processing data packets representing voice over Internet Protocol (VoIP) calls in a packet-switched network is disclosed. According to an embodiment, a VoIP processor executes a voice packet processing operating system that is configured to monitor or manipulate the packets at an IP layer, media layer and signaling layer of the call. The VoIP processor includes a plurality of independently callable primitive software functions that carry out low-level VoIP packet processing functions. The VoIP processor executes one or more application programs that selectively call one or more of the primitive software functions and are independent of any underlying protocols of the existing network, thereby isolating the application programs from low-level processing details. Further, techniques are described for modifying characteristics of VoIP traffic for the purpose of monitoring and directing the VoIP traffic through a network. The techniques include extracting information associated with the VoIP traffic and using the information for the purpose of controlling access, for fraud detection, for billing, for enforcing policy decisions, for protection against denial of service attacks, for lawful interception, for service selection, and other applications.

In one aspect, the invention provides a method of processing data packets representing voice over Internet Protocol (VoIP) calls in a packet-switched network. One or more VoIP processors are provided in the network. Each of the VoIP processors (a) executes a voice packet processing operating system that is configured to monitor or manipulate the packets at a transport layer, media layer and signaling layer of the call, and (b) includes a plurality of independently callable primitive software functions that carry out low-level VoIP packet processing functions. One or more application programs that provide one or more call processing functions by selectively calling one or more of the primitive software functions and are independent of any underlying protocols of the existing network may be executed. In one embodiment, the one or more applications may be executed by the VoIP processor. In other embodiments, the one or more applications may be executed by other network devices. In operation, the VoIP processor detects VoIP packets that pass through the one or more VoIP processors and identifying one or more values of fields in the packets. The VoIP processor creates and stores call state information associated with each call that is represented by the one or more VoIP packets. The processor also modifies one or more of the VoIP packets at either the transport layer, the media layer, or the signaling layer as required to carry out one or more call processing functions of the one or more application programs.

Other aspects and features will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4C is a block diagram that illustrates some example VoIP application programs;

DETAILED DESCRIPTION OF THE PREFERRED EMBODIMENT

Figure 1:
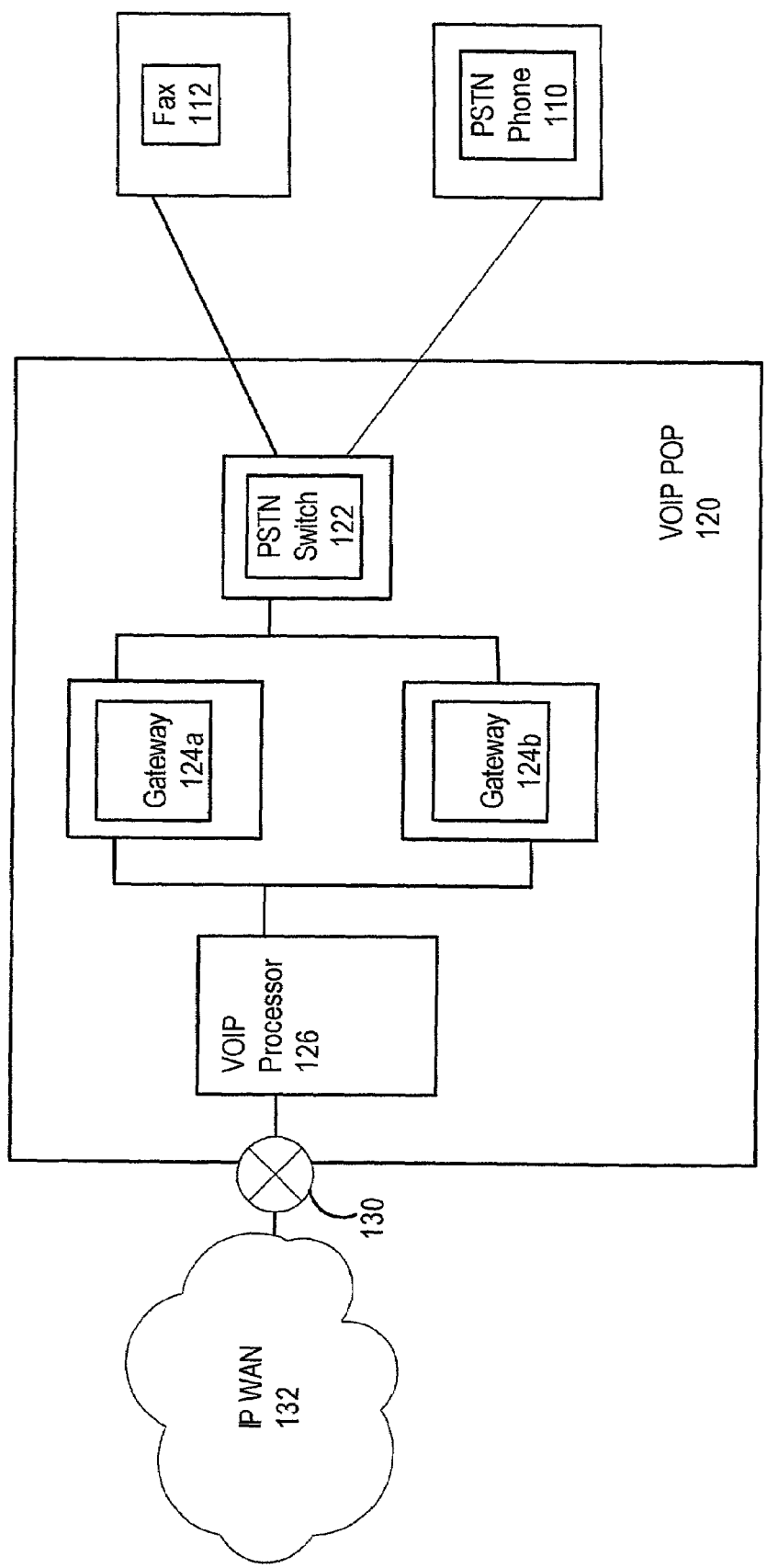
FIG. 1 is a block diagram that illustrates an example location of a VoIP processor within a service provider point of presence.

A processor architecture for processing data packets representing voice over Internet Protocol (VoIP) calls in a packet-switched network is disclosed, and techniques are provided for enabling VoIP traffic in a network without requiring modifications to the existing IP and VoIP network infrastructure. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. GENERAL OVERVIEW

A VoIP network traffic processor is disclosed that may be placed in a conventional packet-switched network in a manner that does not affect operation of other network devices. Using such a transparent platform, a wide variety of problems relating to network operation can be effectively resolved without requiring modifications to the existing IP network and VoIP network infrastructure.

The scope of the disclosure herein of a VoIP processor and the associated VoIP applications includes other types of IP traffic. For example, the disclosed processor and applications apply, without limitation, to network traffic such as video over IP and to streaming media. It will be evident that various modifications and changes may be made thereto without departing from the broader spirit and scope of the invention. The specification and drawings are, accordingly, to be regarded in an illustrative rather than a restrictive sense.

In one embodiment, a VoIP processor is a network device acting as a transparent IP level switch. In one specific embodiment, a VoIP processor has two or more network interfaces (e.g., network interface cards or "NICs"). There is at least one "inbound" interface and at least one "outbound" interface, such that network traffic flows bi-directionally between inbound interfaces and outbound interfaces. The physical network interfaces may be any of a plurality of interfaces, e.g., Fast Ethernet interfaces, Gigabit Ethernet interfaces, ATM interfaces, Packet Over Sonet (POS) interfaces, etc.

In this embodiment, the VoIP processor can track VoIP calls as packet flows associated with the calls move through the network. The VoIP processor is able to perform real-time packet manipulation and measurements at a plurality of logical layers. In one embodiment, the VoIP processor can manipulate and measure packet characteristics associated with the IP layer, media layer, and call signaling layer.

In another embodiment, a VoIP processor includes a plurality of packet-processing software elements that may be incorporated into application programs that carry out a variety of useful functions. Such protocol tracking and packet processing "primitives" can achieve certain functional goals as described below.

In one specific embodiment, a VoIP processor is communicatively coupled in a service provider network at a point of physical or logical discontinuity. For example, a VoIP processor is installed at the exit point from a Point Of Presence (POP) to the Wide Area Network (WAN). Alternatively, the VoIP processor is communicatively coupled between two adjacent networks. In still another alternative, the VoIP processor is communicatively coupled at a strategic peering point within the network.

FIG. 1 is a block diagram that illustrates an example location of a VoIP processor within a service provider point of presence.

In the example of FIG. 1, VoIP point of presence 120 is communicatively coupled to an Internet Protocol wide area network ("IP WAN") 132 and to one or more end user devices, such as a facsimile machine 112, or a telephone 110 of the type conventionally used with the public switched telephone network ("PSTN phone"). Point of presence 120 comprises a VoIP processor 126 that is communicatively coupled to IP WAN 132 through router 130.

VoIP processor 126 is also communicatively coupled to one or more Gateways, two of which are illustrated in FIG. 1 as examples, namely, Gateways 124a and 124b. Gateways 124a and 124b are communicatively coupled to a PSTN switch 122. PSTN switch 122 is communicatively coupled to facsimile machine 112 and PSTN phone 110. Fax machine 112 and phone 110 are illustrated for example purposes, and in a practical embodiment there may be zero to any number of such devices. In addition, there may be any number of gateways and switches.

Figure 2:
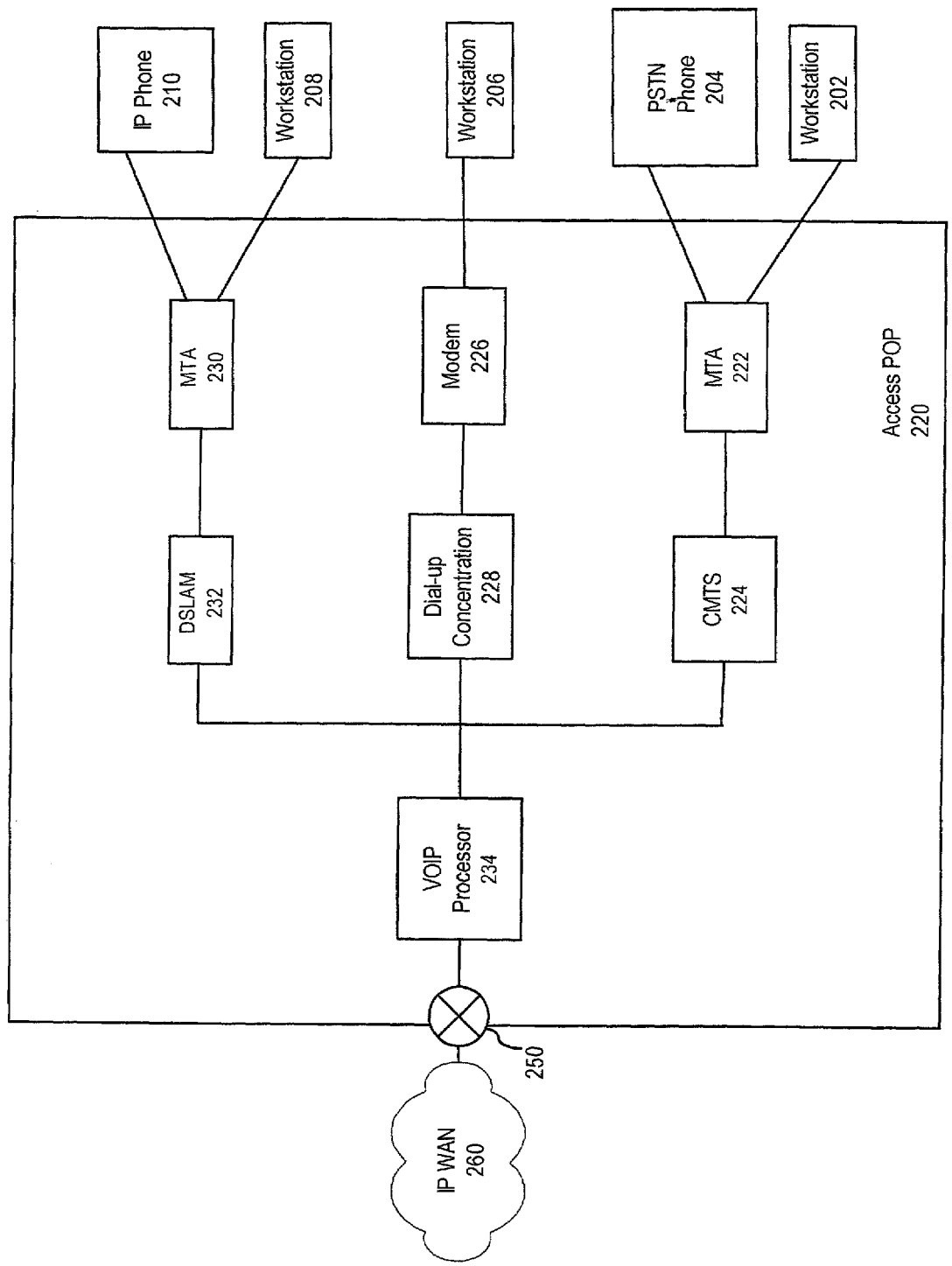
FIG. 2 is a block diagram that illustrates an example location of a VoIP processor within an Access POP.

A VoIP processor may also be used in an Access point of presence of an Internet Service Provider ("ISP") to support endpoints that are communicatively coupled to the ISP through various connection types, such as dial-up, DSL or cable. FIG. 2 is a block diagram that illustrates an example location of a VoIP processor within an Access POP.

In FIG. 2, Access POP 220 is communicatively coupled to an IP WAN 260. Access POP 220 comprises a VoIP processor 234 that is communicatively coupled to IP WAN 260 through router 250. VoIP processor 234 is also communicatively coupled to a digital subscriber line access multiplexer (DSLAM) 232, a dial-up concentrator 228 and a cable modem termination system (CMTS) 224. DSLAM 232 is communicatively coupled to a message transfer agent (MTA) 230, which is in turn communicatively coupled to consumer devices, IP phone 210 and workstation 208. Dial-up concentrator 228 is communicatively coupled to modem 226, which is communicatively coupled to workstation 206. CMTS 224 is connector MTA 222, which is communicatively coupled to PSTN phone 204 and workstation 202.

2. HARDWARE ARCHITECTURE

Figure 3:
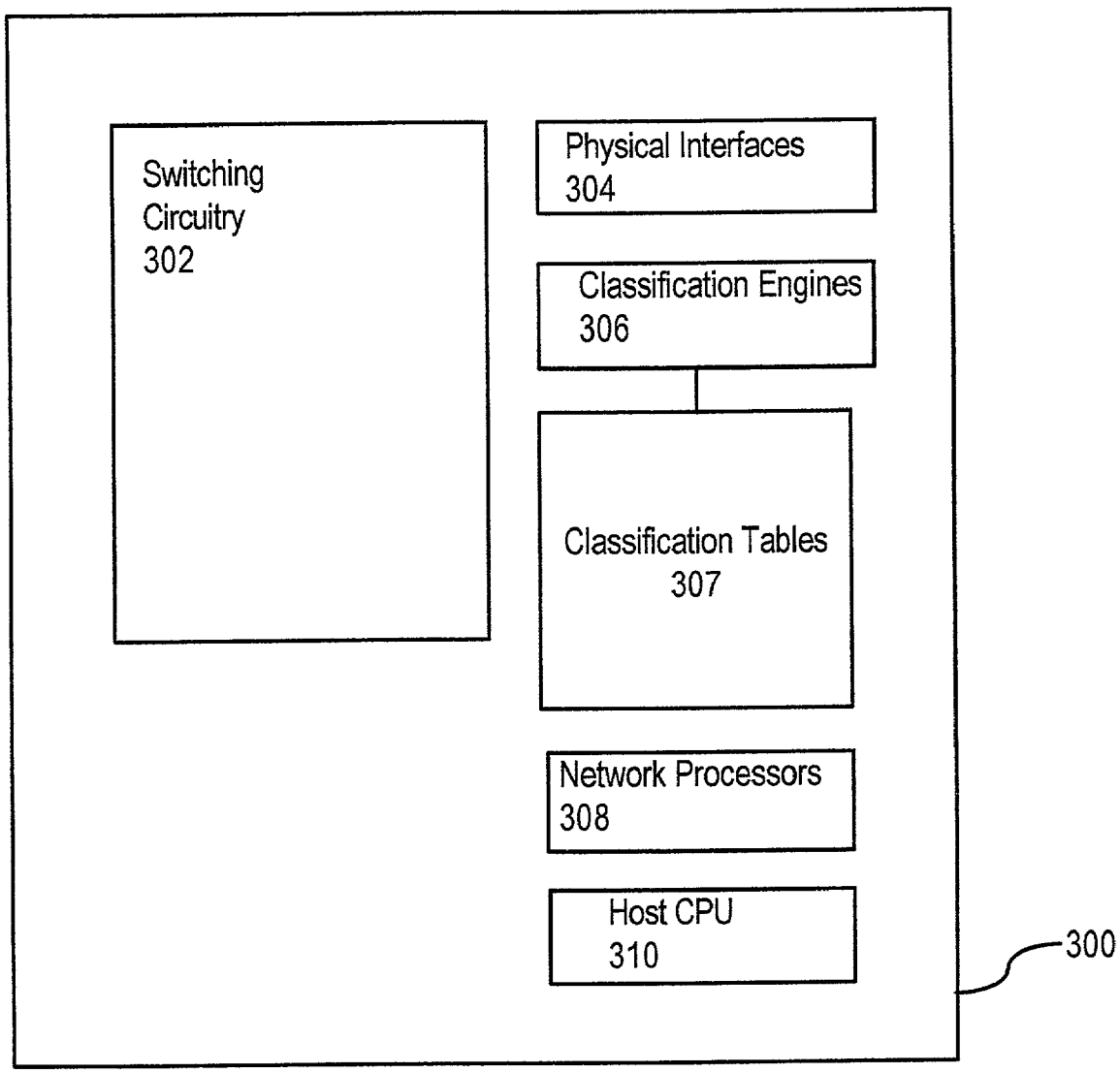
FIG. 3 is a block diagram showing hardware elements of a VoIP processor in one example embodiment.

FIG. 3 is a block diagram showing hardware elements of a VoIP processor in one example embodiment.

In FIG. 3, VoIP processor 300 generally comprises a switching circuitry 302, physical interfaces 304, classification engines 306, classification tables 307, network processors 308 and a host central processing unit (CPU) 310. Each of the foregoing elements may be implemented in hardware, firmware, software, or a combination thereof.

VoIP packets or cells enter and leave the VoIP processor through physical interfaces 304. An example of a physical interface is an Ethernet transceiver or ATM transceiver. There may be any number of such physical interfaces in a VoIP processor.

Upon entering the VoIP processor, VoIP packets pass through switching circuitry 302, which hands the VoIP packets to other components in the system or possibly back to the network through another physical interface. Switching circuitry 302 may comprise a switch matrix or fabric of the type conventionally found in a router, bridge or switch.

Classification engines 306 function to classify the VoIP traffic that enters the VoIP processor by extracting various fields from the VoIP packets. In an embodiment, VoIP processor has one or more pre-processed classification tables 307. When a packet arrives, classification engines 306 examine values of packet header fields such as the protocol field, the source and destination IP address fields, and the source and destination port fields. A table look-up is made for the extracted fields in the classification tables 307, which yields a tag value for each packet. The VoIP packets are tagged accordingly. Switching circuitry 302 also may use the resulting tags to forward the VoIP packets to other components in the system. In one embodiment, classification engines 306 may also examine the Type of Service field and DSCP value. Relevant packets that have been classified into a pre-identified protocol such as Q.931, H.245 or SIP also may be parsed to obtain other relevant parameter values. Such parameter values may include lower level protocol port values, such as the port numbers that are negotiated in the Q.931 protocol for use in an associated H.245 stream. Other parameter values include the caller identifier, called number, type of codec, etc. Such deeper protocol parsing can be done either by the host processor or a network processor.

One or more dedicated network processors 308 execute various packet manipulations and implement primitive software functions of the type described further herein.

Host CPU 310 executes general software based functions such as deep protocol parsing, hardware management, protocols implementation, etc. Host CPU 310 also acts as an overall supervisor of the other elements of the VoIP processor 300. In certain embodiments, a VoIP processor may be multiple host CPUs. Multiple host processors may be used for load sharing or for fulfilling system redundancy objectives.

In one embodiment, the VoIP processor 300 is implemented using a line card architecture in which the physical interfaces, classification engines and network processors are combined on a circuit board called a line card. One or more such line cards are connected to a backplane. Communications among hardware elements on the backplane may be controlled by a bus circuitry or switching circuitry of any conventional type.

VoIP processor 300 also includes one or more non-volatile mass storage devices, one or more main memory devices, and one or more input/output ports of the type provided in conventional computer servers. VoIP processor 300 may include or interface to other hardware and software systems such as database servers, etc.

In one specific embodiment, the VoIP processor is configured to provide high availability by means of two or more redundant power supplies, duplicate fans, duplicate host CPUs, etc. In another embodiment, each hardware element of the VoIP processor has circuitry that enables removal and replacement of each such element while power remains applied and the processor is running ("hot swapping").

3. SOFTWARE ARCHITECTURE

3.1 Generally

In one embodiment, host CPU 310 executes two logically separate software systems: a voice packet processing operating system and one or more VoIP application programs. In this configuration, in operation, VoIP processor 300 may be viewed as a vertical, voice-specific, Policy Enforcement Point (PEP) network device. Specifically, VoIP processor 300 is interposed in a VoIP network and receives and analyzes all packets that go through the network. VoIP processor 300 parses all packets that represent VoIP traffic, and tracks the state of each call. In certain embodiments, the one or more application programs may be executed on one or more entities that are separate from host CPU 310. For example, the one or more application programs may be executed at one or more external Policy Decision Points (PDP) network devices. VoIP processor 300 creates and stores data based on the parsed packets, at an abstraction layer logically above the underlying VoIP protocols, such as MGCP, the H.323 recommendations published by the International Telecommunications Union (ITU), etc. In this way, the VoIP application programs may be written independently of the VoIP protocol used. The VoIP processor parses and acts on packets at the IP layer, the media layer and the signaling layer.

Figure 4A:
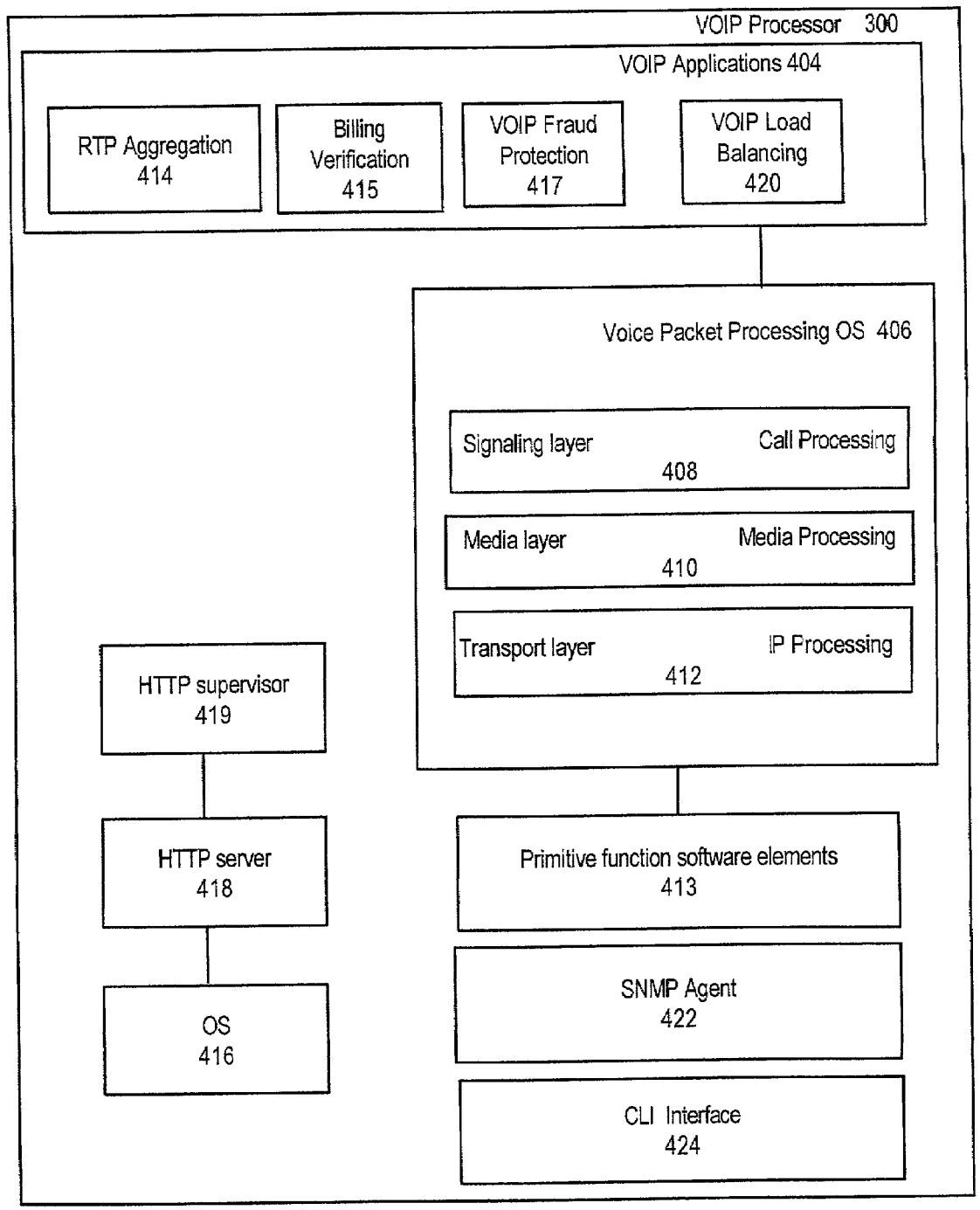
FIG. 4A is a block diagram that illustrates a software architecture of a VoIP processor according to one embodiment.

FIG. 4A is a block diagram that illustrates a software architecture of a VoIP processor according to one embodiment.

In FIG. 4A, VoIP processor 300 executes one or more application programs ("VoIP applications") 404, and a voice packet processing operating system ("OS") 406. VoIP applications 404 comprise application programs that carry out functions useful in voice call processing. For example, VoIP applications 404 may comprise Real-Time Protocol (RTP) aggregation application 414, billing verification application 415, VoIP Denial of Service (DoS) protection 417, VoIP load balancing application 420, etc. Functions and operations of such applications are described further herein in the section entitled "Application Examples."

Voice packet processing operating system 406 comprises a signaling layer 408 that performs call processing, a media layer 410 that performs media processing and a transport layer 412 that performs IP processing. In one specific embodiment, voice packet processing operating system 406 includes a plurality of primitive function software elements 413 ("primitives") that carry out low-level packet processing functions. Each of the primitives may be implemented as a subroutine, programmatic object, or other element that layer 408, 410, 412 or an application program can invoke to carry out a desired low-level function. Specific functions and operations of such primitives are described further herein in the section entitled "Primitive Function Software Elements." In the case where VoIP applications are executed by one or more external network devices, the primitives may be remotely accessed by the external network device through an Application Program Interface using protocols such as Common Open Policy Service (COPS), Media Gateway Control (MEGACO) and Common Object Request Broker Architecture (CORBA).

In one embodiment, VoIP processor 300 also executes a conventional operating system 416, HTTP server 418, and HTTP supervisor application 419. Operating system 416 may comprise any suitable computer operating system such as Linux, BSD UNIX, Windows NT, etc. It may interoperate with a basic input/output system (BIOS) or a kernel. HTTP supervisor application 419 interacts with HTTP server 418 to create one or more dynamic pages in response to user commands and requests that are received at the HTTP server. Thus, the HTTP server 418 and HTTP supervisor application 419 implement a Web-based user interface (UI) to VoIP processor 300 that allows an end user to manage the VoIP processor by directing a Web browser at it over a network. The UI provides for configuration and provisioning of the VoIP processor 300, as well as for monitoring its status.

In this or another embodiment, the VoIP processor may also be controlled using the Simple Network Management Protocol (SNMP protocol) using SNMP agent 422, or through a command line interface using CLI interface 424, which may be, for example, a serial port, Telnet agent, etc.

3.2 Primitive Function Software Elements

At each layer among signaling layer 408, media layer 410, and transport layer 412, the VoIP processor 300 executes one or more basic primitives that act on the actual VoIP packet streams and are performed in real time without affecting the speed of transport of packets through the network of which the VoIP processor is a part. With this architecture, VoIP processor 300 is specifically designed to expose programmable interfaces and allow external logic to control the platform primitives.

Figure 4B:
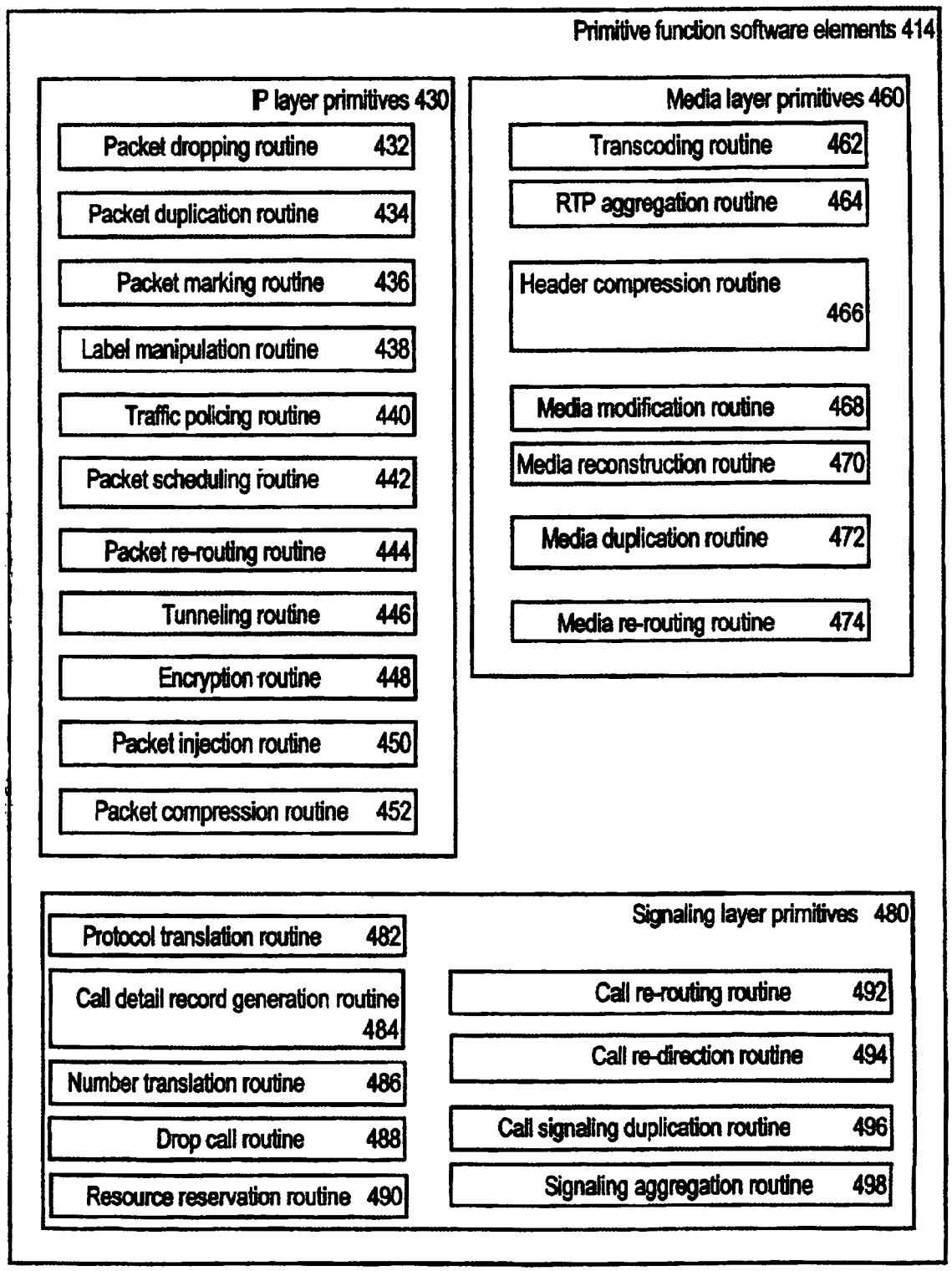
FIG. 4B is a block diagram that illustrates some example VoIP processor primitives.

FIG. 4B is a block diagram that illustrates some example VoIP processor primitives. In one embodiment, primitive function software elements 413 comprise IP layer primitives 430, media layer primitives 460, and signaling layer primitives 480, as described further in the following sections.

3.2.1 IP Layer Primitives

IP layer primitives 430 may include a packet dropping routine 432, packet duplication routine 434, packet marking routine 436, Multi-protocol Label Switching (MPLS) label manipulation routine 438, traffic policing routine 440, packet scheduling routine 442, packet re-routing routine 444, tunneling routine 446, encryption routine 448, packet injection routine 450, and packet compression routine 452.

Packet dropping routine 432 is called to drop packets based on various parameters in the IP header. This primitive is useful for preventing certain media and signaling streams from entering the network, and may be used by firewall applications, protection against denial of service attacks application, access control applications, etc.

Packet duplication routine 434 is called to duplicate and send packets to a new destination, either by changing the destination IP address or by using various encapsulation protocols. This primitive may be used by a lawful interception application, for example, which may direct the duplicated traffic to a real-time tapping or recording system.

Packet marking routine 436 can modify the Type of Service (ToS) field or the DiffServ CodePoint (DSCP) in the IP header of a packet.

Label manipulation routine 438 can label a packet when the destination IP address of the packet indicates that the packet is entering an MPLS domain. Thus, an application that uses label manipulation routine 438 may cause the VoIP processor to operate as an MPLS gateway. Within an MPLS domain, the label may be modified or a new label may be pushed or popped on top of the label stack. Label manipulation also may be used by traffic engineering applications.

Traffic policing routine 440 is called to cause the VoIP processor 300 to enforce limits on the bandwidth that is permitted for various traffic flows, for example, by remarking excess traffic or dropping excess traffic.

Packet scheduling routine 442 is called to cause the VoIP processor to classify a packet into one or more queues. To support packet scheduling routine 442, in one embodiment, VoIP processor uses various queuing mechanisms and has one or more queues, each queue having a priority value and other characteristics.

Packet re-routing routine 444 is called to re-route a packet to a new destination. In one embodiment, packet re-routine routine 444 modifies the destination IP address of the re-routed packet, or encapsulates the original packet in a new protocol.

Tunneling routine 446 is called to encapsulate one or more packets and put them into tunneled flows.

Encryption routine 448 is called to encrypt one or more packets before they are sent to their destination.

Packet injection routine 450 is called to cause the VoIP processor 300 to inject new packets into a given flow. This primitive may be used by applications such as the RTP Reconstruction application, which is described further herein.

Packet compression routine 452 is called to compress one or more RTP media streams as they traverse through the VoIP processor. Compression may comprise header compression, compression of a payload portion of a packet, or compression of both header and payload.

3.2.2 Media Layer Primitives

Media layer primitives 460 may include a transcoding routine 462, RTP aggregation routine 464, header compression routine 466, media modification routine 468, media reconstruction routine 470, media duplication routine 472, media re-routing routine 474.

Transcoding routine 462 is called to cause the coder/decoder used by VoIP processor 300 to carry voice or fax media to change in real time (on the fly). For example, transcoding routine 462 may be called when the two endpoints of a call do not support the same codec types.

RTP aggregation routine 464 may carry out RTP aggregation, which may also be referred to as RTP multiplexing, or RTP trunking. In RTP aggregation, multiple packets of different RTP flows are aggregated together with one single header, provided the packets share a common sub-route. Thus, when properly invoked, the RTP aggregation routine 464 may save a significant amount of bandwidth.

Header compression routine 466 is called to compress an IP header, UDP header, and/or RTP header using various header compression techniques.

Media modification routine 468 is called to cause the VoIP processor to decode the voice stream, modify it and re-encode it. Media modification routine 468 also may be used for applications such as ad insertion, voice announcements, etc.

Media reconstruction routine 470 is called to reconstruct dropped or lost packets. When packets are dropped from a VoIP call, the dropped packets have a significant effect on voice quality. Most endpoints are incapable of recovering lost packets. VoIP processor 300, however, may use innovative compressed and uncompressed media reconstruction techniques for recovering some of the lost packets and improve the voice quality.

Media duplication routine 472 is called to duplicate one or more media streams within an application, such as a lawful interception application, call logging application, etc.

Media re-routing routine 474 is called to re-route one or more media streams to a new destination or re-routed through a particular network path.

3.2.3 Signaling Layer Primitives

Signaling layer primitives 480 may comprise a protocol translation routine 482, call detail record generation routine 484, number translation routine 486, drop call routine 488, resource reservation routine 490, call re-routing routine 492, call re-direction routine 494, call signaling duplication routine 496, and signaling aggregation routine 498.

Protocol translation routine 482 is called to cause the VoIP processor 300 to translate between signaling protocols or protocol flavors to facilitate the communication between incompatible endpoints.

Call detail record generation routine 484 is called to generate one or more accurate Call Detail Records (CDRs) or IP Detail Records (IPDRs). Specifically, by parsing the voice protocols in the three layers, the VoIP processor may accurately measure exact network usage and also report mismatches between the signaling reports and the actual media sent.

Number translation routine 486 is called to cause the VoIP processor to make on-the-fly modifications to fields in signaling messages. Examples of modifications include replacement and translation of such fields. In one embodiment, number translation routine 486 is called to carry out telephone number translations associated with applications such as a Local Number Portability (LNP) application.

Drop call routine 488 is called to cause calls to be dropped based on various parameters. Examples of parameters that may cause an application to drop a call include identity of the caller or callee (e.g., to block certain numbers or area codes), etc. This primitive may be used by an admission control application and an access control application.

Resource reservation routine 490 is called to carry out a resource reservation on behalf of endpoints that are otherwise incapable of performing resource reservations using protocols such as Resource reSerVation Protocol (RSVP).

Call re-routing routine 492 is called to re-route a call through an alternate route using methods such as MPLS and tunneling. Re-routing may include the re-routing of the signaling messages in addition to the media.

Call redirection routine 494 may be used by gateway load balancing applications in order to direct incoming calls to the most appropriate gateway in a gateway farm or anywhere else in the network.

Call signaling duplication routine 496 is called to duplicate signaling elements of a call. Signaling may have to be duplicated for use in applications such as lawful interception and call logging. Logging the signaling is necessary in order to fully replay a recorded call.

Signaling aggregation routine 498 is called, for example, to provide connection re-use. A call setup may include multiple signaling protocols and connections between a pair of endpoints. Most such protocols run over TCP, and the setup time for such connections may be significant. By maintaining an open connection between a pair of VoIP processors, some of the connection setup delays are avoided by tunneling the signaling messages through the already opened and maintained TCP connection.

In one embodiment, FIG. 4C is a block diagram that illustrates some example VoIP application programs, as described further in the following sections.

3.3 Application Programs

VoIP applications 404, executed by VoIP processor 300, serve as Policy Decision Points and provide logic for controlling the VoIP processor. The applications 404 instruct VoIP processor 300 how and when to activate the primitive function software elements 413. In a complementary manner, voice packet processing operating system 416 isolates the applications 404 from low-level protocol details.

In certain embodiments, applications 404 may be executed on separate network devices for which the protocols and APIs used for communication between the VoIP processor 300 and applications 404 are standardized and published. Accordingly, third party developers may expand the number and functions of VoIP applications 404 by writing new code based on the published protocols and APIs. The VoIP processor allows for implementation of multiple applications on top of a unified hardware and software platform specifically tailored for VoIP policy enforcement.

Advantageously, applications 404 are deployed at VoIP processor 300, rather than at call endpoints (e.g., IP phones or gateways). Applications that are deployed at call endpoints would require communicating regular and continual updates to the endpoints. In contrast, VoIP processor 300 that are deployed in front of call endpoints allows for efficient and centralized implementation of applications 404. Further, the centralized implementation for applications 404 disclosed herein enables an end user to use applications 404 before the rest of the equipment in the end user's network is upgraded, if at all, to support VoIP.

3.3.1 Cost Reduction Applications

VoIP processor 300 may carry out various cost reduction applications including RTP aggregation application 414, an application-level call routing application 431, scalable traffic engineering application 433, RSVP aggregation application 435, and load balancing application 437.

3.3.1.1 Call Aggregation Application

Most VoIP gateways send a stream of small packets for each call. Each such packet carries approximately 80% of redundant data (packet headers) versus 20% of actual media encoding. Thus, this stream of many small packets effectively reduces the available bandwidth. Using unique call aggregation and compression techniques, VoIP processor 300 can increase the number of calls issued for a given bandwidth significantly, e.g., by a factor of 2 to 5. An example of a header compression technique is further described in RFC 2508. Header compression techniques may be used in conjunction with RTP compression techniques to improve bandwidth utilization.

Using RTP aggregation application 414, VoIP processor 300 aggregates a number of calls to share the "cost" of headers between packets belonging to different calls. RTP aggregation application 414 uses compression algorithms that use general protocol parsing techniques for tracking calls, maintaining the state of calls, identifying codecs, etc. A detailed description of an example aggregation algorithm is provided in co-pending application Ser. No. 09/775,214, filed Jan. 31, 2001, entitled "Method and Apparatus for Call Aggregation," by named inventors S. Mohaban et al., the entire contents of which is hereby incorporated by reference as if fully set forth herein. Using RTP aggregation application 414, VoIP processor 300 causes a substantial bandwidth reduction, while improving other aspects of the network behavior, such as reducing the load on routers and improving the behavior of queues.

In one embodiment, RTP aggregation application 414 ensures a prescribed limit on the induced latency. For example, RTP streams are partitioned based on certain criteria including the destination subnet of the RTP stream, and the codec of the RTP stream. When the first packet of a trunk arrives at VoIP processor 300, a timer may be started. The timer is set to expire at an allowed maximum value of latency. The allowed maximum value of latency may be user-selected. As packets continue to arrive at VoIP processor 300, the packets are aggregated either when the number of packets reach a pre-selected number or when the timer expires.

Applications that work on multiple voice sessions simultaneously often get more effective as the number of concurrent calls gets larger. In the case of call aggregation, the larger the number of calls sharing a common network sub-route, the better the bandwidth utilization that can be achieved. By aggregating calls originating from multiple endpoints (gateways and IP phones) the call aggregation application on the VoIP processor improves the ability to aggregate more calls. For example, in case of IP phones, aggregation simply is not applicable on a single phone. However, the calls from several IP phones may be aggregated by the call aggregation application running on a VoIP processor.

3.3.1.2 Application Level Call Routing

In a past approach, VoIP equipment, such as gateways and IP phones, blindly relies on the IP infrastructure for connectivity. While this approach performs well for traditional, non-real-time traffic, conventional IP routing has many shortcomings that arise in transport of real-time quality sensitive traffic, such as VoIP. Using an application-level call routing application 431, a network operator deploys an overlaid network of VoIP processors. As a result, the network operator can control the routing of the call in an IP network by designing or engineering alternative routes in the network. Such alternative routes can be used when congestion is identified along one of the default IP routes. When congestion is identified, the VoIP processors form a virtual path along which the traffic is redirected, thus circumventing the congested areas in the network.

Figure 5:
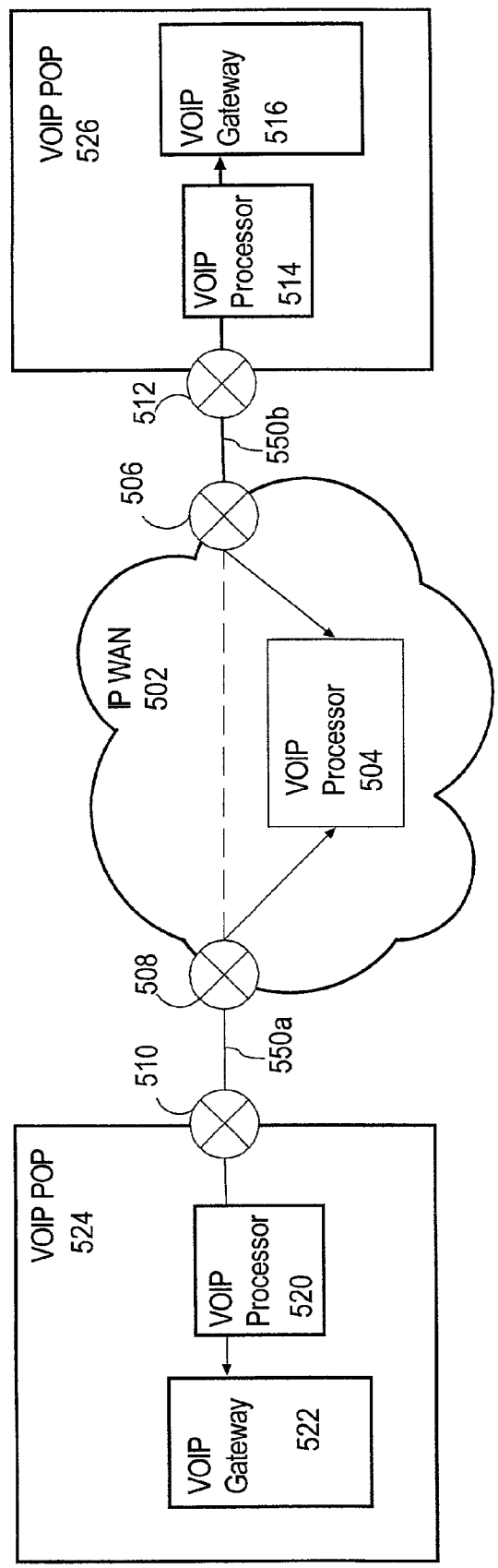
FIG. 5 is a block diagram that illustrates a virtual path formed by VoIP processors in a network under control of application-level call routing application.

FIG. 5 is a block diagram that illustrates a virtual path formed by VoIP processors in a network under control of application-level call routing application 431. In FIG. 5, an IP WAN 502 is communicatively coupled to VoIP points of presence 526, 524 by routers 506, 512 and routers 508, 510, respectively. Point of presence 524 includes VoIP processor 520 and VoIP gateway 522. Point of presence 526 includes VoIP processor 514 and VoIP gateway 516. IP WAN 502 includes VoIP processor 504. Each of the VoIP processors 514, 520 is a processor of the type described herein in connection with FIG. 3, FIG. 4A, FIG. 4B, FIG. 4C and each such processor executes a copy of application-level call routing application 431. A virtual path formed by VoIP processors 520, 504, 514 is indicated by the bi-directional arrows 550a, 550b.

In this configuration, the application-level call routing application 431 improves overall call quality by avoiding congested areas. Further, application 431 balances and averages out instantaneous peak loads in the network. In general, Internet data traffic tends to be bursty and unpredictable. Certain links can become congested, which can cause voice packets to be delayed or dropped. As a result, call quality can degrade, or a call can fail to start. In response to such conditions, application 431 can divert network traffic from congested areas of the network to less congested areas of the network. The application 431 improves the predictability of voice service quality by ensuring that the best virtual path is available and placed in use when the network is loaded. The application 431 works in conjunction with RTP aggregation application 414 to ensure quality while decreasing overall bandwidth consumption.

Thus, by routing traffic through explicitly defined routes using the overlaid network of VoIP processors, a service provider can bypass such congestion and send the traffic through less congested routes. This can increase the number of completed calls and can improve call quality.

In one embodiment, application-level call routing application 431 uses automatic quality of service (QoS) sensing technology to automatically decide upon the diversion of traffic to alternate routes. Typically, QoS sensing technology involves the constant monitoring of traffic in the network.

QoS may be assessed by using the call tracking and state information associated with each call, which is maintained by the VoIP processor. In certain embodiments, synthetic calls may be generated between two VoIP processors through defined routes in the overlaid network in order to periodically monitor the quality of such routes. Thus, a VoIP processor may maintain information on route-quality on a list of possible routes to other VoIP processors. Further, application 416 provides more effective path selection in MPLS-based networks.

3.3.1.3 Scalable Traffic Engineering

In another embodiment, using a scalable traffic engineering application 433, one or more VoIP processors 300 may serve as intermediate devices between disparate domains, some of which have traffic engineering support (e.g. MPLS domains) and some of which do not have such support. Generally, regular traffic engineering methods are not usually used across the whole network. MPLS "islands" are usually separated by non-MPLS domains, and different neighboring carriers use different network architectures and technologies. Also, traffic-engineering methods usually include creating explicit routes between the network ingress and egress points. Such methods would not scale to large networks as too many such explicit routes might be needed.

In one embodiment, using one or more VoIP processors, a network is created or overlaid on top of the general network. VoIP processors are deployed at a domain edge and at peering points. Within each domain, either regular traffic engineering methods are used, such as explicit route establishment using a protocol such as RSVP-TE and CR-LDP, or new routes are created between the VoIP processors within the domain.

Figure 6:
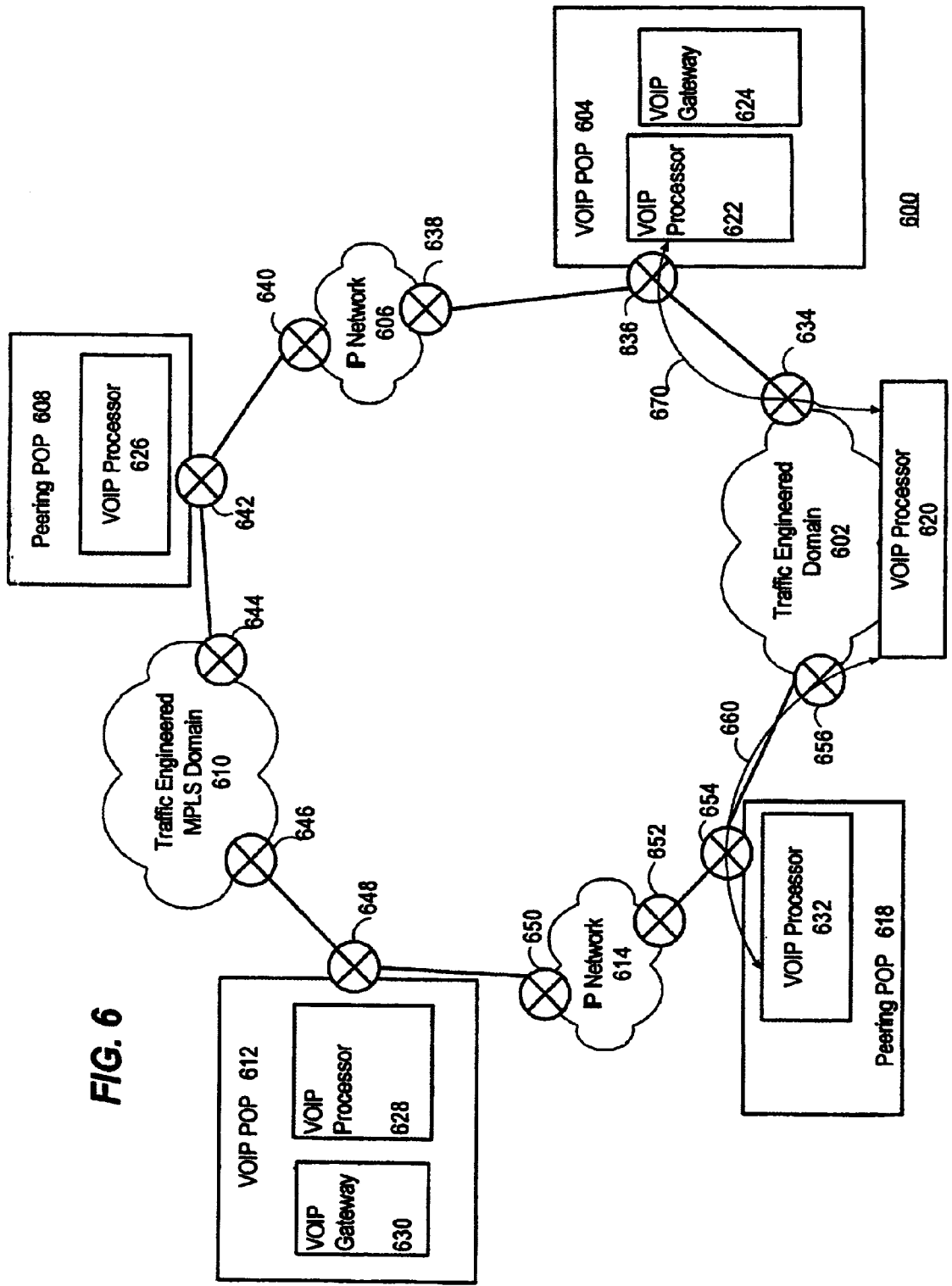
FIG. 6 is a block diagram that illustrates a network that is overlaid on a general network by using VoIP processors in traffic engineering domains.

FIG. 6 is a block diagram that illustrates a network that is overlaid on a general network by using VoIP processors in traffic-engineered domains, VoIP points of presence and Peering POPs.

In FIG. 6, network 600 comprises Traffic Engineered Domains (e.g., using MPLS) 602, 610, IP networks 606, 614, VoIP points of presence 604, 612 and Peering POPs 608, 618. Traffic Engineered Domain 602 has a VoIP processor 620 located at its logical edge. Traffic Engineered Domain 602 is communicatively coupled to VoIP point of presence 604 and Peering POP 618 by routers 634, 636 and routers 656, 654 respectively. VoIP point of presence 604 includes a VoIP processor 622 that is communicatively coupled to VoIP gateway 624. VoIP point of presence 604 is also communicatively coupled to IP network 606 through routers 636, 638.

IP network 606 is communicatively coupled to Peering POP 608 through router 640, 642. Peering POP 608 includes VoIP processor 626. Peering POP 608 is communicatively coupled to Traffic Engineered MPLS Domain 610 through routers 642, 644. Traffic Engineered MPLS Domain 610 is communicatively coupled to VoIP point of presence 612 through routers 646, 648. VoIP point of presence 612 includes VoIP processor 628 communicatively coupled to VoIP gateway 630. VoIP point of presence 612 is communicatively coupled to IP network 614 through routers 648, 650. IP network 614 is communicatively coupled to Peering POP 618 through routers 652, 654. Peering POP 618 includes VoIP processor 632. Arrows 660, 670 indicate routes between VoIP processors 632, 620, 622.

In this configuration, a carrier may be able to guarantee a Service Level Agreement (SLA) between two VoIP processors that reside on two edges of the carrier's network. As a result, a relatively small number of routes exist between the VoIP processors at the domain edges.

Traffic engineering may further be deployed across an entire network by establishing specific routes between VoIP processors of different domains. Each traffic-engineered path between two VoIP processors becomes a "link" in the global network traffic engineering process. A set of provisioned and measured attributes such as bandwidth, delay, etc., are created and stored for each link. One or more of the attributes may be guaranteed by an SLA with the service provider.

A routing protocol is executed by the overlaid network's VoIP processors to establish such routes. For example, routing protocols such as Open Shortest Path First (OSPF) may be modified to enable the VoIP processor to make routing decisions based on quality metrics carried by OSPF. Alternatively, label distribution protocols such as LDP and RSVP-TE may be modified, or the routing protocol can be based on pre-provisioned neighborhood relations between peers. The VoIP processor can further measure and collect information on the call quality of each path segment, and feed this information as constraints into the constraint based routing protocols. Measurement is either passive, by listening to ongoing calls, or active, by generating specific calls with specific parameters and measuring their performance.

Routes within a domain can be traffic engineered using MPLS or set using the overlaid VoIP processor network. Routes between separate domains can be set between the VoIP processors of those domains.

3.3.1.4 RSVP Aggregation

The Resource reSerVation Protocol (RSVP) is an IETF proposed standard that can be used to reserve certain network resources (bandwidth, buffer sizes) in routers along a network path for a specific flow of traffic. However, a problem with RSVP is its inability to scale (handle an unlimited increase in the number of reservation requests) because each router along a network path is required to maintain state information for each microflow that passes through the router. This requirement can mean that certain routers positioned in the backbone of the network must store millions of state information, which is undesirable given the limited storage and processing capabilities of typical routers. However, a recent proposal by the IETF would amend the RSVP specification to allow for aggregation of multiple smaller reservations into one larger reservation in a hierarchical way.

In one embodiment, a VoIP processor 300 carries out such aggregated reservation, and is an ideal location to serve as an aggregation point, especially when operating in conjunction with the application-level call routing application 431. Such larger reservations are established across the network between pairs of VoIP processors according to policies relying on various parameters such as the number of current calls, statistics on call patterns, etc. Such aggregated reservations may be dynamically modified according to network conditions, time of day, expected traffic patterns, etc. The VoIP processor 300 also may also serve as an admission control point in order to decide which calls get to use which routes and reservations.

3.3.1.5 Load Balancing Among Voice Gateways

VoIP points of presence often have a multitude of VoIP gateways, and new gateways are added as more capacity is required. Managing such large farms of VoIP gateways becomes complex and does not allow the ISP to fully exploit the available resources.

Figure 7:
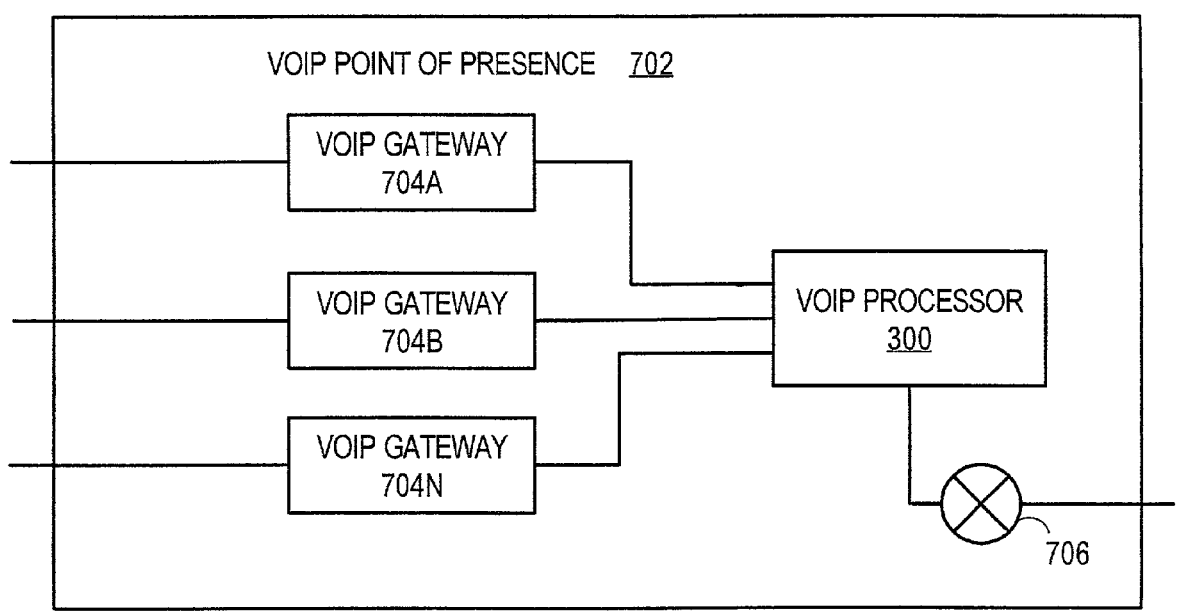
FIG. 7 is a block diagram of an example point of presence in which a VoIP processor acts as a load balancer for a plurality of gateways.

FIG. 7 is a block diagram of an example point of presence in which a VoIP processor acts as a load balancer for a plurality of gateways. In one embodiment, VoIP point of presence 702 includes any number of VoIP gateways 704A, 704B, 704N. A VoIP processor 300 is communicatively coupled to the VoIP gateways 704A, 704B, 704N and is logically located between the gateways and a router 706. In this configuration, by deploying a VoIP processor in front of a gateway farm, an ISP can configure the entire farm to be represented to the rest of the network by a single IP address, namely the IP address of the VoIP processor. Further, VoIP processor 300 balances the load between the VoIP gateways. The VoIP processor can support any of a plurality of conventional load-balancing algorithms of the type used to load balance between Web servers in Web server farms.

In this configuration, VoIP processor 300 also can decide, in real time and based on dynamic measurements and provisioned information, how to route an incoming call and make sure it is handled by the most appropriate gateway in the farm according to various policies set by the network administrator.

3.3.2 Revenue Protection Applications

VoIP processor 300 can execute any of a plurality of revenue protection applications including a billing & interconnect verification application 439, access control and fraud detection application 441, RTP reconstruction application 443, and differentiated services application 447.

3.3.2.1 Billing & Interconnect Verification

As described above, in one embodiment, VoIP processor 300 parses each packet to identify values of fields in VoIP protocols at the media layer and the signaling layer. Accordingly, VoIP processor 300 can collect accurate details about each voice call that is traversing a network in which the VoIP processor resides. Such details may include the call length, number of packets transmitted, service granted to such packets (e.g., a DiffServ CodePoint or RSVP reservation), quality (e.g. jitter, dropped packets), etc.

In one embodiment, VoIP processor 300 creates and stores such information in a database. Under control of a billing & interconnect verification application 424, VoIP processor issues a detailed, accurate and vendor independent Call Details Record (CDR or IPDR) containing such information.

Unlike a Gatekeeper, VoIP processor 300 monitors not only signaling layer information but also media layer information, and therefore VoIP processor 300 can associate media flows with signaling flows to make sure the network operator receives a complete picture of network usage. Further, VoIP processor 300 relies on actual network activity to measure call details. Service providers, especially ones using a clearing-house model, can use VoIP processor 300 to verify the accuracy of CDRs generated by affiliates' equipment, and to resolve disputes with respect to CDRs that are generated differently by the two parties.

Further, since VoIP processor 300 is an active element of the network, billing & interconnect verification application 424, or another application, can activate one or more primitive software functions to enforce certain policies in case of a billing problem. For example, the VoIP processor can drop a call that is too long.

3.3.2.2 Access Control & Fraud Detection

Because Internet standards are published, and because modern Customer Premises Equipment (CPE) devices are relatively sophisticated, some malicious users can easily bypass the billing mechanisms of current VoIP service providers. One of the main problems is that the current architecture generally relies on the call endpoint to issue certain signaling requests whenever a call starts and ends. This characteristic is almost universal in environments in which where all the equipment resides in the service provider network and is controlled by it. As an example, this characteristic is experienced when VoIP gateways are used within the POP. When the call endpoint is in a POP or other facility that is controlled by a service provider, it may be made secure. However, control and security are no longer assured when a call endpoint is a CPE element, such as a residential gateway, IP phone or PC phone.

In one embodiment, a VoIP processor 300 actively monitors and detects fraudulent calls in the network. Based on a policy set by the service provider that owns and operates the VoIP processor, the VoIP processor can drop such calls in real-time. In one embodiment, VoIP processor 300 executes an access control/fraud detection application 441 with which the VoIP processor monitors packets at the signaling layer and the media layer, and checks for any inconsistencies between them. For example, VoIP processor 300 under control of application 441 can detect that a user signals the end of a call, but an associated media stream remains in operation. The call can then either be dropped or charged according to the actual use. The application can also change the media stream, for example, by inserting packets that sound a warning to the caller on the line.

3.3.2.3 Protection Against Denial of Service Attacks

Recently malicious individuals have launched "denial of service" attacks against certain extensively used electronic commerce Web sites, including Amazon.com and Yahoo. These attacks suggest that the more open and useful a system is, the more exposed it is to such attacks.

Commercial VoIP systems are based on existing and emerging standard protocols (H.323, SIP, etc.), and are experiencing ever-increasing rates of commercial usage. Due to the complexity of the protocols, malicious individuals can attack VoIP devices such as gateways relatively easily in a manner against which regular firewalls cannot protect. For example, an attacker can bombard a gateway with RTP-like packets, which have dynamic port numbers and are therefore difficult to detect by a regular firewall. Such fake RTP packets can either interfere with existing calls, deny access to free ports, or even cause the gateway to halt operation.

According to one embodiment, a VoIP processor 300 provides more extensive protection against such attacks by explicitly tracking state information associated with all calls in the network, along with port numbers and expected usage patterns of all calls. Accordingly, most fake RTP-like floods can be immediately detected and discarded before they reach the gateways.

3.3.2.4 RTP Reconstruction

RTP packets that are dropped or lost on the way from the sender endpoint to the receiver endpoint can result in a severe reduction in the audible quality of a call. The human ear is sensitive to such loss and even a loss of a fraction of the packets can lead to an unacceptable quality, depending on the actual codec that is in use. However, most of a lost RTP packet can be recovered and reconstructed based on various extrapolation techniques. Such techniques can work on either compressed voice media packets, or on uncompressed analog voice information. However, most endpoints do not have the CPU power or sufficient programmed intelligence to be able to recover such lost packets.

In one embodiment, a VoIP processor is positioned logically in front of a call endpoint and executes an RTP reconstruction application 443. In this configuration, the VoIP processor serves as an RTP reconstructor for such endpoints. For example, the VoIP processor can sense lost packets, and in response, use various techniques and algorithms for reconstructing a packet that is similar to the original missing packet. The artificially generated packet is then sent to the endpoint. As a result, voice quality is improved.

3.3.2.5 Differentiated Services

In another embodiment, VoIP processor 300 executes a differentiated services application 447. In this configuration, the VoIP processor serves as a Voice Policy Enforcement Point, and can carry out admission control, policing, and ensuring the level of service provided to each call. The VoIP processor can actively set the priority of each call, according to industry standards such as DiffServ and MPLS. It can also accept or deny resource reservation requests based on dynamic or static policies and even serve as an RSVP proxy. VoIP processor 300 also can police and shape packets that pass through it to conform with predefined bandwidth constraints and minimum guarantees.

3.3.3 New Revenue Generation Applications

VoIP processor 300 can execute any of a plurality of new revenue generation applications, including a call privacy application 445, lawful interception application 449, and service selection application 451.

3.3.3.1 Call Privacy

In another embodiment, VoIP processor 300 executes a call privacy application 445. In this configuration a first VoIP processor, residing in the voice traffic path, can encrypt all packets of all calls going through it; a second VoIP processor can decrypt them at the other end of the connection. The service provider can deploy various policies regarding which calls to encrypt and the encryption method to use, and can charge for this service if desired. A service provider also can allow the end customer new privacy services such as blocked caller ID, also referred to as anonymization. For example, the VoIP processor can block such information as soon as the voice signaling leaves the VoIP processor and enters the service provider network.

3.3.3.2 Lawful Interception

Some regulatory environments require service providers to provide government agencies the ability to tap into voice calls. PSTN service providers have established solutions for such lawful interception, but there are no established lawful interception applications for use by Internet telephony service providers.

In one embodiment, VoIP processor 300 executes a lawful interception application 449. In this configuration, VoIP processor can dynamically duplicate calls going through it and send the packets associated with a duplicated call, including both signaling layer information and media layer information, to a tapping or tracking system that taps into the calls. The tapping system reconstructs the call from the saved information. For example, the tapping system examines the signaling layer information and the media layer information and associates between them, synchronizes between the two or more parties, etc.

3.3.3.3 Service Selection

In yet another embodiment, VoIP processor 300 resides on the edge of a point of presence and is communicatively coupled to multiple backbone service providers, each of which is associated with a different service provider network. In this embodiment, VoIP processor 300 routes voice traffic to one of the service provider networks according to one or more parameters including user preference, network quality, chosen service, etc. In cooperation with VoIP processor 300, service selection application 451 enables a user to choose between a multitude of services and service providers. For example, a user may dial a specific access code to select a service or VoIP processor 300 may carry out an interactive voice response (IVR) dialogue with a user to select a service. Alternatively, a user may pre-select a service. In response to the user selection information, VoIP processor 300 can route the calls to the appropriate carrier. The access service provider can route the calls through a private high quality network, or through the open Internet based on how much the user is willing to pay. Also, the access service provider can work with multiple carriers offering different service levels and pass these services on to the end user.

4. HARDWARE OVERVIEW

Figure 8:
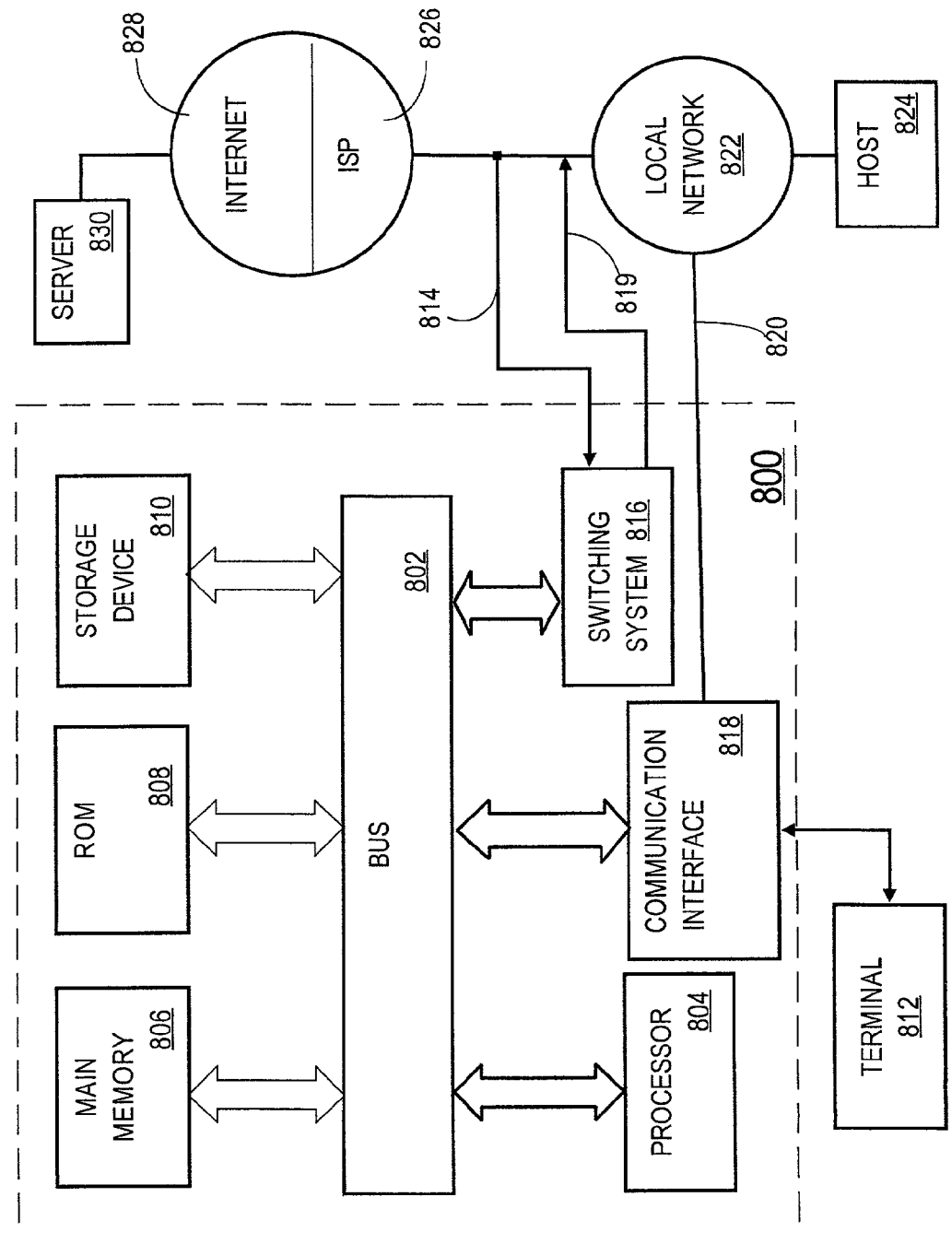
FIG. 8 depicts a computer upon which embodiments of the invention may be implemented.

FIG. 8 is a block diagram that illustrates a computer system 800, elements of which may be used in an embodiment of VoIP processor 300.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 818 may be coupled to bus 802 for communicating information and command selections to processor 804. Interface 818 is a conventional serial interface such as an RS-232 or RS-422 interface. An external terminal 812 or other computer system connects to the computer system 800 and provides commands to it using the interface 814. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

The invention is related to the use of computer system 800 for monitoring and processing voice over IP packets. According to one embodiment of the invention, monitoring and processing voice over IP packets are provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 818 also provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams.

The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for monitoring and processing voice over IP packets as described herein.

The received code may be executed by processor 804 as it is received, and/or stored in storage device 810, or other non-volatile storage for later execution. In this manner, computer system 800 may obtain application code in the form of a carrier wave.

5. CONCLUSION

A VoIP processor, primitive function software elements, and associated application programs are disclosed herein. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Beneficially, the VoIP processor provides abstraction of underlying protocols. Specifically, the VoIP processor can hide from the applications the details that are protocol specific, thus creating an abstraction layer. The abstraction allows applications to focus on the specific logic that they implement rather than on non-important details. Such abstraction can scale to new protocols as they evolve over time.

Further, the VoIP processor provides a flexible voice PEP with a set of voice PDP applications controlling the primitives. This architecture allows for very efficient primitive implementation and enables external applications containing the actual logic to be developed and deployed rapidly on top of it. Another benefit of the VoIP processor is its focus on voice traffic rather than on general data traffic. The primitives are structured specifically for voice applications.

What is claimed is:

1. A method of processing data packets representing voice over Internet Protocol (VoIP) calls in a packet-switched network, the method comprising the computer-implemented steps of:

providing in the packet-switched network one or more VoIP processors at each of a plurality of alternative routing points such that the VoIP processors form a virtual network overlaid upon the packet-switched network, wherein each of the VoIP processors (a) executes a voice packet processing operating system that is configured to monitor or manipulate voice packets at a transport layer, a media layer and a signaling layer of the call, and (b) includes a plurality of independently callable primitive software functions that carry out low-level VoIP packet processing functions;

detecting VoIP packets that pass through the one or more VoIP processors and identifying one or more values of fields in the packets;

creating and storing call state information associated with each call that is represented by the one or more values of fields in the packets;

creating and storing call state information associated with each call that is represented by the one or more VoIP packets;

detecting, at one of the VoIP processors, network congestion along a routing path in the packet-switched network; and modifying one or more of the VoIP packets at either the transport layer, the media layer, or the signaling layer as required to carry out one or more call processing functions of one or more application programs to re-route a call along a virtual path between two or more of the VoIP processors of the virtual network.

2. The method of claim 1, wherein one or more of the plurality of independently callable primitive software functions are selectively called by the one or more application programs that provide the one or more call processing functions and are independent of any underlying protocols of an existing network, and wherein the one or more application programs are executed on one or more devices that are separate from the one or more VoIP processors.

3. The method of claim 1, wherein one or more of the plurality of independently callable primitive software functions are selectively called by the one or more application programs that provide the one or more call processing functions and are independent of any underlying protocols of an existing network, and wherein the one or more application programs are executed on the one or more VoIP processors.

4. The method of claim 1, wherein one of the plurality of independently callable primitive software functions comprises modifying the one or more VoIP packets at the transport layer.

5. The method of claim 1, wherein one of the plurality of independently callable primitive software functions comprises dropping at the transport layer the one or more VoIP packets.

6. The method of claim 1, wherein one of the plurality of independently callable primitive software functions comprises injecting at the transport layer new VoIP packets to augment the one or more VoIP packets.

7. The method of claim 1, wherein one of the plurality of independently callable primitive software functions comprises dropping at the media layer the one or more VoIP packets.

8. The method of claim 1, wherein one of the plurality of independently callable primitive software functions comprises injecting at the media layer new VoIP packets to augment the one or more VoIP packets.

9. The method of claim 1, wherein one of the plurality of independently callable primitive software functions comprises dropping at the signaling layer the one or more VoIP packets based on one or more signaling parameters associated with a call signal.

10. The method of claim 1, wherein one of the plurality of independently callable primitive software functions comprises injecting at the signaling layer new VoIP packets to augment the one or more VoIP packets.

11. The method of claim 1, wherein one of the plurality of independently callable primitive software functions comprises modifying at the media layer one or more media characteristics of a plurality of media characteristics associated with the one or more VoIP packets.

12. The method of claim 1, wherein one of the plurality of independently callable primitive software functions comprises modifying at the signaling layer one or more signaling characteristics of a plurality of signaling characteristics associated with the one or more VoIP packets.

13. The method of claim 4, wherein modifying at the transport layer the one or more VoIP packets further comprises duplicating the one or more VoIP packets at the transport layer.

14. The method of claim 4, wherein modifying at the transport layer the one or more VoIP packets further comprises marking the one or more VoIP packets at the transport layer.

15. The method of claim 4, wherein modifying at the transport layer the one or more VoIP packets further comprises labeling the one or more VoIP packets at the transport layer.

16. The method of claim 4, wherein modifying at the transport layer the one or more VoIP packets further comprises scheduling for routing the one or more VoIP packets at the transport layer.

17. The method of claim 4, wherein modifying at the transport layer the one or more VoIP packets further comprises re-routing the one or more VoIP packets at the transport layer.

18. The method of claim 4, wherein modifying at the transport layer the one or more VoIP packets further comprises tunneling the one or more VoIP packets at the transport layer.

19. The method of claim 4, wherein modifying at the transport layer the one or more VoIP packets further comprises encrypting the one or more VoIP packets at the transport layer.

20. The method of claim 4, wherein modifying at the transport layer the one or more VoIP packets further comprises compressing the one or more VoIP packets at the transport layer.

21. The method of claim 11, wherein modifying at the media layer one or more media characteristics further comprises changing a codec associated with the one or more VoIP packets.

22. The method of claim 11, wherein modifying at the media layer one or more media characteristics further comprises aggregating the one or more VoIP packets under a single Real-Time Transport Protocol header when the one or more VoIP packets share a common sub-route.

23. The method of claim 11, wherein modifying at the media layer one or more media characteristics further comprises compressing headers associated with the one or more VoIP packets.

24. The method of claim 11, wherein modifying at the media layer one or more media characteristics further comprises de-coding a media stream associated with the one or more VoIP packets.

25. The method of claim 11, wherein modifying at the media layer one or more media characteristics further comprises re-coding a media stream associated with the one or more VoIP packets.

26. The method of claim 11, wherein modifying at the media layer one or more media characteristics further comprises re-constructing a media stream associated with the one or more VoIP packets.

27. The method of claim 11, wherein modifying at the media layer one or more media characteristics further comprises duplicating a media stream associated with the one or more VoIP packets.

28. The method of claim 11, wherein modifying at the media layer one or more media characteristics further comprises re-routing a media stream associated with the one or more VoIP packets.

29. The method of claim 12, wherein modifying at the signaling layer one or more signaling characteristics further comprises translating one or more signaling protocols from a plurality of signaling protocols associated with the signaling layer.

30. The method of claim 12, wherein modifying at the signaling layer one or more signaling characteristics further comprises generating call detail records and IP detail records by parsing VoIP protocols at an IP layer, the media layer and the signaling layer.

31. The method of claim 12, wherein modifying at the signaling layer one or more signaling characteristics further comprises translating one or more signaling fields in a signaling message associated with the one or more VoIP packets.

32. The method of claim 12, wherein modifying at the signaling layer one or more signaling characteristics further comprises performing resource reservation for a call signal.

33. The method of claim 12, wherein modifying at the signaling layer one or more signaling characteristics further comprises re-routing a call signal.

34. The method of claim 12, wherein modifying at the signaling layer one or more signaling characteristics further comprises re-directing a call signal based on a load balancing criteria for determining a use of gateways.

35. The method of claim 12, wherein modifying at the signaling layer one or more signaling characteristics further comprises duplicating call signals.

36. The method of claim 12, wherein modifying at the signaling layer one or more signaling characteristics further comprises aggregating call signals.

37. The method of claim 36, further comprises maintaining an open signaling connection between two or more VoIP processors of the plurality of VoIP traffic processing devices.

38. The method of claim 1, wherein the one or more application programs implement one or more policy decisions associated with a VoIP traffic.

39. The method of claim 1, wherein the one or more application programs comprise a call aggregation application program that aggregates a plurality of packets pertaining to a same call into one aggregated packet.

40. The method of claim 1, wherein the one or more application programs comprise a load balancing application and further comprising the steps of:
  logically coupling the one or more VoIP processors to a plurality of gateways in the packet-switched network;
  routing all the packets associated with the call to a selected one of the gateways that is best able to carry the call according to a load-balancing determination within the load balancing application.

41. The method of claim 1, wherein the one or more application programs comprise a billing and interconnect verification application and further comprising the steps of:
  under control of the billing and interconnect verification application, at one of the VoIP processors, creating and storing one or more sets of call detail information collected at the media layer and the signaling layer for one or more voice calls that are traversing a network in which the VoIP processor resides;
  creating and storing a call detail record for each of the voice calls based on the call detail information.

42. The method of claim 41, wherein the call detail information comprises one or more values selected from among the call length, number of packets transmitted, service granted to such packets and call quality.

43. The method of claim 1, wherein the one or more application programs comprise a protection against denial of service application and further comprising the steps of:
  creating and storing state information associated with all calls in the packet-switched network, including port numbers of all calls;
  determining that one or more calls comprise an unexpectedly large plurality of RTP-like packets;
  in response to such determination, dropping all packets in the large plurality from further transmission within the network.

44. The method of claim 1, wherein the one or more application programs comprise a real-time transport protocol reconstruction application and further comprising the steps of:
  under control of the reconstruction application, detecting loss of at least one packet associated with a plurality of packets associated with a call that is passing through the one or more VoIP processors;
  creating and storing a reconstructed packet to replace a lost packet based on characteristics of other packets within the plurality of packets; and
  forwarding the reconstructed packet in place of the lost packet among the plurality of packets associated with the call.

45. The method of claim 1, wherein the one or more application programs comprise a call privacy application and further comprising the steps of:
  under control of the call privacy application, encrypting the voice packets;
  forwarding the data packets in encrypted form to a second VoIP processor that is associated with a terminating endpoint of the call and that is configured to decrypt the data packets.

46. The method of claim 1, wherein the one or more application programs comprise a differentiated services application and further comprising the steps of, under control of the differentiated services application, carrying out one or more operations selected from among: setting a priority value of all packets associated with a specified call; accepting a resource reservation request based on one or more policies; denying the resource reservation request based on one or more policies.

47. The method of claim 1, wherein the one or more application programs comprise a lawful interception application and further comprising the steps of:
  under control of the lawful interception application, duplicating one or more packets associated with a specified call that is a subject of law enforcement monitoring to result in creating and storing a plurality of duplicated packets;
  forwarding the duplicated packets to a tapping application that is configured to reconstruct the specified call based on the duplicated packets.

48. The method of claim 1, wherein the one or more application programs comprise a service selection application and further comprising the steps of:
  logically coupling the one or more VoIP processor to a plurality of service providers that can send and receive calls destined or originating outside the packet-switched network;
  receiving service information that identifies one of the plurality of service providers that has been previously selected by a calling party associated with a specified call that is passing through the VoIP processor;

forwarding all packets associated with the specified call to one of the plurality of service providers based on the service selection information.

49. A method of processing data packets representing voice over Internet Protocol (VoIP) calls in a packet-switched network comprising:

providing in the packet-switched network one or more VoIP processors at each of a plurality of alternative routing points such that the VoIP processors form a virtual network overlaid upon the packet-switched network, wherein a first one of the alternative routing points is at an edge of a traffic-engineered domain of the packet-switched network and at least a second of the alternative routing points is at a peering point of presence associated with a service provider of the network, and further wherein each of the VoIP processors (a) executes a voice packet processing operating system that is configured to monitor or manipulate voice packets at a transport layer, a media layer and a signaling layer of the call, and (b) includes a plurality of independently callable primitive software functions that carry out low-level VoIP packet processing functions;

detecting VoIP packets that pass through the one or more VoIP processors and identifying one or more values of fields in the packets;

creating and storing call state information associated with each call that is represented by the one or more values of fields in the packets;

creating and storing call state information associated with each call that is represented by the one or more VoIP packets;

modifying one or more of the VoIP packets at either the transport layer, the media layer, or the signaling layer as required to carry out one or more call processing functions of one or more application programs, wherein at least one of the application programs comprises a traffic engineering application;

under control of the traffic engineering application, creating and storing one or more specified routes from at least the first one of the alternative routing points to at least the second of the alternative routing points, in association with network performance criteria information;

at one of the VoIP processors, detecting that the network performance criteria are satisfied for at least one call that has been routed along a conventional routing path in the packet-switched network; and re-routing the at least one call along one of the specified routes between two or more of the VoIP processors of the virtual network.

50. A method of processing data packets representing voice over Internet Protocol (VoIP) calls in a packet-switched network comprising:

providing in the packet-switched network one or more VoIP processors at each of a plurality of resource reservation points in the packet-switched network, wherein each of the VoIP processors (a) executes a voice packet processing operating system that is configured to monitor or manipulate voice packets at a transport layer, a media layer and a signaling layer of the call, and (b) includes a plurality of independently callable primitive software functions that carry out low-level VoIP packet processing functions;

detecting VoIP packets that pass through the one or more VoIP processors and identifying one or more values of fields in the packets;

creating and storing call state information associated with each call that is represented by the one or more values of fields in the packets;

creating and storing call state information associated with each call that is represented by the one or more VoIP packets;

modifying one or more of the VoIP packets at either the transport layer, the media layer, or the signaling layer as required to carry out one or more call processing functions of one or more application programs, wherein at least one of the application programs comprises a resource reservation application;

under control of the resource reservation application at one of the VoIP processors, detecting that one of a plurality of network performance criteria are satisfied for at least one call that has been routed along a routing path in the packet-switched network;

creating an aggregated resource reservation request for a plurality of calls; and communicating the aggregated resource reservation request to all the VoIP processors such that a large reservation is established across the network between pairs of VoIP processors.

51. The method of claim 50, wherein the network performance criteria comprises a number of current calls in the network.

52. A method of processing data packets representing voice over Internet Protocol (VoIP) calls in a packet-switched network comprising:

providing in the packet-switched network one or more VoIP processors, wherein each of the VoIP processors (a) executes a voice packet processing operating system that is configured to monitor or manipulate voice packets at a transport layer, a media layer and a signaling layer of the call, and (b) includes a plurality of independently callable primitive software functions that carry out low-level VoIP packet processing functions;

detecting VoIP packets that pass through the one or more VoIP processors and identifying one or more values of fields in the packets;

creating and storing call state information associated with each call that is represented by the one or more values of fields in the packets;

creating and storing call state information associated with each call that is represented by the one or more VoIP packets;

modifying one or more of the VoIP packets at either the transport layer, the media layer, or the signaling layer as required to carry out one or more call processing functions of one or more application programs, wherein at least one of the application programs comprises an access control and fraud detection application;

under control of the access control and fraud detection application, monitoring one or more packets associated with a call at the signaling layer and the media layer;

determining that a user associated with the call has signaled an end of the call and that a media stream associated with the call remains in operation; and in response to such determination, dropping all packets associated with the call from further transmission within the packet-switched network.

53. The method of claim 52, further comprising the steps of, in response to such determination, inserting one or more packets that sound a warning to the user associated with the call.

54. A computer-readable medium comprising one or more sequences of instructions for processing data packets representing voice over Internet Protocol (VoIP) calls in a packet-switched network, wherein the packet-switched network includes one or more VoIP processors at each of a plurality of alternative routing points such that the VoIP processors form a virtual network overlaid upon the packet-switched network, wherein each of the VoIP processors (a) executes a voice packet processing operating system that is configured to monitor or manipulate one or more voice packets at a transport layer, a media layer and a signaling layer of the call, (b) includes a plurality of independently callable primitive software functions that carry out low-level VoIP packet processing functions, and (c) executes one or more application programs that provide one or more call processing functions by selectively calling one or more of the primitive software functions and are independent of any underlying protocols of an existing network, and in which the sequences of instructions, when executed by one or more processors, cause the one or more processors to carry out the steps of:
  detecting VoIP packets that pass through the one or more VoIP processors and identifying one or more values of fields in the packets;
  creating and storing call state information associated with each call that is represented by the one or more VoIP packets;
  detecting, at one of the VoIP processors, network congestion along a routing path in the packet-switched network; and
  modifying one or more of the VoIP packets at either the transport layer, the media layer, or the signaling layer as required to carry out one or more call processing functions of the one or more application programs to re-route a call along a virtual path between two or more of the VoIP processors of the virtual network.

55. An apparatus for processing data packets representing voice over Internet Protocol (VoIP) calls in a packet-switched network, comprising:
  one or more VoIP processors at each of a plurality of alternative routing points such that the VoIP processors form a virtual network overlaid upon the packet-switched network, wherein each of the VoIP processors (a) executes a voice packet processing operating system that is configured to monitor or manipulate the packets at a transport layer, a media layer and a signaling layer of the call, (b) includes a plurality of independently callable primitive software functions that carry out low-level VoIP packet processing functions, and (c) executes one or more application programs that provide one or more call processing functions by selectively calling one or more of the primitive software functions and are independent of any underlying protocols of an existing network;
  means for detecting VoIP packets that pass through the one or more VoIP processors and identifying one or more values of fields in the packets;
  means for creating and storing call state information associated with each call that is represented by the one or more VoIP packets;
  means for detecting, at one of the VoIP processors, network congestion along a routing path in the packet-switched network; and
  means for modifying one or more of the VoIP packets at either the transport layer, the media layer, or the signaling layer as required to carry out one or more call processing functions of the one or more application programs to re-route a call along a virtual path between two or more of the VoIP processors of the virtual network.

56. An apparatus for processing VoIP traffic, the apparatus comprising:
  means for overlaying one or more VoIP processors at alternative routing points such that the VoIP processors form a virtual network overlaid upon an existing packet-switched network;
  means for listening to VoIP packets that are passing through the one or more VoIP processors;
  means for parsing one or more VoIP packets that are passing through the one or more VoIP processors;
  means for tracking and storing a state information associated with the one or more VoIP packets;
  means for providing on the one or more VoIP processors a VoIP operating system on which can be executed a plurality of VoIP applications that are independent of any underlying protocols of the existing network;
  means for detecting, at one of the VoIP processors, network congestion along a routing path in the packet-switched network; and
  means for modifying one or more of the VoIP packets at either the transport layer, the media layer, or the signaling layer as required to carry out one or more call processing functions of one or more application programs to re-route a call along a virtual path between two or more of the VoIP processors of the virtual network.

57. A method of processing data packets representing video over Internet Protocol data in a packet-switched network, the method comprising the computer-implemented steps of:
  providing in the packet-switched network one or more video over Internet Protocol processors at each of a plurality of alternative routing points such that the video over Internet Protocol processors form a virtual network overlaid upon the packet-switched network, wherein each of the video over Internet Protocol processors (a) executes a video packet processing operating system that is configured to monitor or manipulate the packets at a transport layer, a media layer and a signaling layer, (b) includes a plurality of independently callable primitive software functions that carry out low-level video over Internet Protocol packet processing functions, and (c) executes one or more application programs that provide one or more video processing functions by selectively calling one or more of the primitive software functions and are independent of any underlying protocols of an existing network;
  detecting video over Internet Protocol packets that pass through the one or more video over Internet Protocol processors and identifying one or more values of fields in the packets;
  creating and storing video state information associated with each video display that is represented by the one or more video over Internet Protocol packets;
  detecting, at one of the video over Internet Protocol processors, network congestion along a routing path in the packet-switched network; and
  modifying one or more of the video over Internet Protocol packets at either the transport layer, the media layer, or the signaling layer as required to carry out one or more video processing functions of the one or more application programs to re-route the video over Internet Protocol packets along a virtual path between two or more of the video over Internet Protocol processors of the virtual network.

58. An apparatus for processing data packets representing video over Internet Protocol data in a packet-switched network, comprising:

one or more video over Internet Protocol processors at each of a plurality of alternative routing points such that the video over Internet Protocol processors form a virtual network overlaid upon the packet-switched network, wherein each of the video over Internet Protocol processors (a) executes a video packet processing operating system that is configured to monitor or manipulate the packets at a transport layer, a media layer and a signaling layer, (b) includes a plurality of independently callable primitive software functions that carry out low-level video over Internet Protocol packet processing functions, and (c) executes one or more application programs that provide one or more video processing functions by selectively calling one or more of the primitive software functions and are independent of any underlying protocols of an existing network;

means for detecting video over Internet Protocol packets that pass through the one or more video over Internet Protocol processors and identifying one or more values of fields in the packets;

means for creating and storing video state information associated with each video display that is represented by the one or more video over Internet Protocol packets;

means for detecting, at one of the video over Internet Protocol processors, network congestion along a routing path in the packet-switched network; and means for modifying one or more of the video over Internet Protocol packets at either the transport layer, the media layer, or the signaling layer as required to carry out one or more video processing functions of the one or more application programs to re-route the video packets along a virtual path between two or more of the video over Internet Protocol processors of the virtual network.

59. An apparatus for processing video over Internet Protocol data traffic, the apparatus comprising:

means for overlaying one or more video over Internet Protocol data processors at each of a plurality of alternative routing points such that the video over Internet Protocol processors form a virtual network overlaid upon an existing packet-switched network;

means for listening to video over Internet Protocol packets that are passing through the one or more video over Internet Protocol data processors means for parsing one or more video over Internet Protocol data packets that are passing through the one or more video over Internet Protocol data processors;

means for tracking and storing a video state information associated with the one or more video over Internet Protocol data packets;

means for providing on the one or more video over Internet Protocol data processors a video over Internet Protocol data operating system on which can be executed a plurality of video over Internet Protocol data applications that are independent of any underlying protocols of the existing network means for detecting, at one of the video over Internet Protocol data processors, network congestion along a routing path in the packet-switched network; and means for modifying one or more of the video over Internet Protocol packets at either the transport layer, the media layer, or the signaling layer as required to carry out one or more call processing functions of one or more application programs to re-route a call along a virtual path between two or more of the video over Internet Protocol processors of the virtual network.

60. An apparatus for processing voice over Internet Protocol data traffic on a network, the apparatus comprising:

one or more physical interfaces through which voice over Internet Protocol data packets enter and leave;

a switching interface that receives the voice over Internet Protocol data packets from the one or more physical interfaces for distribution to one or more components of a voice over Internet Protocol data system;

one or more classification engines coupled to the switching interface for classifying the voice over Internet Protocol data traffic;

one or more processors coupled to the switching interface and to the one or more classification engines to receive the voice over Internet Protocol data packets therefrom;

a memory accessible to the one or more processors; and one or more sequences of instructions stored in the memory which, when executed by the one or more processors, cause the one or more processors to carry out the steps of:

listening to the voice over Internet Protocol data packets that are passing through the apparatus;

parsing one or more voice over Internet Protocol data packets that are passing through the apparatus;

tracking and storing a voice state information associated with the one or more voice over Internet Protocol data packets; and executing one or more voice over Internet Protocol data applications of a plurality of voice over Internet Protocol data applications that are independent of any underlying protocols of the network to detect, at one of the VoIP processors, network congestion along a routing path in the network and modify one or more of the voice over IP data packets at either a transport layer, a media layer, or a signaling layer as required to re-route a call along a virtual path between two or more of routing points.

61. An apparatus for processing video over Internet Protocol data traffic on a network, the apparatus comprising:

one or more physical interfaces through which video over Internet Protocol data packets enter and leave;

a switching interface that receives the video over Internet Protocol data packets from the one or more physical interfaces for distribution to one or more components of a video over Internet Protocol data system;

one or more classification engines coupled to the switching interface for classifying the video over Internet Protocol data traffic;

one or more processors coupled to the switching interface and to the one or more classification engines to receive the video over Internet Protocol data packets therefrom;

a memory accessible to the one or more processors; and one or more sequences of instructions stored in the memory which, when executed by the one or more processors, cause the one or more processors to detect, at one of the processors, network congestion along a routing path in the network and modify one or more of the video over Internet Protocol data packets at either a transport layer, a media layer, or a signaling layer as required to re-route a call along a virtual path between two or more of routing points by:

IP processing associated with one or more video over Internet Protocol data packets of a plurality of video over Internet Protocol data packets at a transport layer;

media processing at a media layer; and video processing at a signaling layer.

* * * * *